United States Patent [19]

Gibson

[11] Patent Number: 4,489,173

[45] Date of Patent: * Dec. 18, 1984

[54] LARGE PORE SHAPED HYDROPROCESSING CATALYSTS

[75] Inventor: Kirk R. Gibson, El Cerrito, Calif.

[73] Assignee: Chevron Research Company, San Francisco, Calif.

[*] Notice: The portion of the term of this patent subsequent to Jul. 5, 2000 has been disclaimed.

[21] Appl. No.: 510,105

[22] Filed: Jun. 30, 1983

Related U.S. Application Data

[63] Continuation-in-part of Ser. No. 291,588, Aug. 10, 1981, Pat. No. 4,391,740.

[51] Int. Cl.$^3$ .............................................. B01J 35/02
[52] U.S. Cl. ................................... 502/313; 502/305; 502/527; 208/216 PP
[58] Field of Search .................. 502/305, 313, 527; 208/216 PP

[56] References Cited

U.S. PATENT DOCUMENTS

| | | | |
|---|---|---|---|
| Re. 30,155 | 11/1979 | Gustafson | 208/216 |
| 2,408,164 | 9/1946 | Foster | 502/229 |
| 3,347,798 | 10/1967 | Baer et al. | 252/448 |
| 3,674,680 | 7/1972 | Hoekstra et al. | 208/111 |
| 3,764,565 | 10/1973 | Jacobs et al. | 502/305 |
| 3,957,627 | 5/1976 | Herrington et al. | 208/216 |
| 3,966,644 | 6/1976 | Gustafson | 502/255 |
| 3,997,426 | 12/1976 | Montagna et al. | 208/10 |
| 4,028,227 | 6/1977 | Gustafson | 208/216 |
| 4,113,661 | 12/1978 | Tamm | 252/465 |
| 4,116,819 | 9/1978 | Frayer et al. | 208/216 |
| 4,133,777 | 1/1979 | Frayer et al. | 502/309 |

FOREIGN PATENT DOCUMENTS 893160 8/1982 Belgium .

*Primary Examiner*—W. J. Shine
*Attorney, Agent, or Firm*—S. R. Lapaglia; W. K. Turner; D. P. Freyberg

[57] ABSTRACT

Shaped catalysts useful for hydroprocessing hydrocarbon feedstocks. The catalysts are shaped as oval extrudates and having at least one ridge. The particles can be circumscribed by rectangles having two dimensions, a first dimension between 0.085 inch and 0.125 inch and a second dimension between 0.065 inch and 0.10 inch.

12 Claims, 3 Drawing Figures

LARGE PORE SHAPED HYDROPROCESSING CATALYSTS

CROSS REFERENCE TO RELATED APPLICATIONS

This application is a continuation-in-part of application Ser. No. 291,588, filed Aug. 10, 1981, now U.S. Pat. No. 4,391,740, which is incorporated herein by reference.

BACKGROUND OF THE INVENTION

This invention relates to catalytic compositions and their use for the hydroprocessing, e.g. hydrodesulfurization and hydrodemetalation of feedstocks containing sulfur and metals. In particular, this invention concerns shaped extruded catalysts that are polylobal in cross-section.

A number of catalyst shapes have been described in the prior art. U.S. Pat. No. 2,408,164 to Foster discloses catalyst shapes including solid and hollow cylinders, elongated star shapes, cylinders with corrugated edges, etc. Similar shapes are also shown in U.S. Pat. No. 3,997,426 to Montagna et al. U.S. Pat. Nos. 3,966,644 and RE. 30,155 issued to Gustafson disclose trilobal catalysts for hydrocarbon conversion. U.S. Pat. Nos. 3,674,680 and 3,764,565 to Hoekstra and Jacobs disclose catalyst shapes designed to eliminate catalytic material more than 0.015 inch from the catalyst surface and give surface area to volume ratios of between 100 and 250 inch$^{-1}$. U.S. Pat. No. 3,347,798 to Baer et al discloses the production of hollow bead catalysts. U.S. Pat. No. 3,957,627 discloses spherical catalysts having a void center and a hole extending to the external surface. U.S. Pat. Nos. 4,116,819 and 4,133,777 disclose catalysts in the shape of elongated extrudates having alternating longitudinal grooves and protrusions on the surface.

The purpose of shaped catalysts has been to increase surface-to-volume ratio over conventional shapes, such as round cylinders and spheres to increase effective diffusion and increase metals loadings. Surface-to-volume ratios can be increased by reducing the size of the particles, but beds of such particles tend to have unacceptably high pressure drops across the bed.

SUMMARY OF THE INVENTION

This invention provides a catalyst for hydroprocessing heavy hydrocarbonaceous feedstocks, which catalyst:

(a) comprises between 2 and 25 weight percent of a catalytic metal from Group VIB and between 0 and 15 weight percent of a catalytic metal from Group VIII supported on a catalyst base selected from the group consisting of refractory inorganic oxides, fibrous clays, and combinations thereof, where said weight percentages are based on the reduced catalytic metal content as a percentage of the total catalyst weight; and (b) has the form of elongated extrudates which have:
 (i) a cross-section which is an oval with at least one section extending from the flat surface of the oval and which has a first dimension between about 0.060 and about 0.125 inch and a second dimension, perpendicular to the first dimension, between about 0.030 and about 0.100 inch; and
 (ii) a surface area to volume ratio of less than 95 reciprocal inches.

DETAILED DESCRIPTION

Feedstocks

Figure 1:
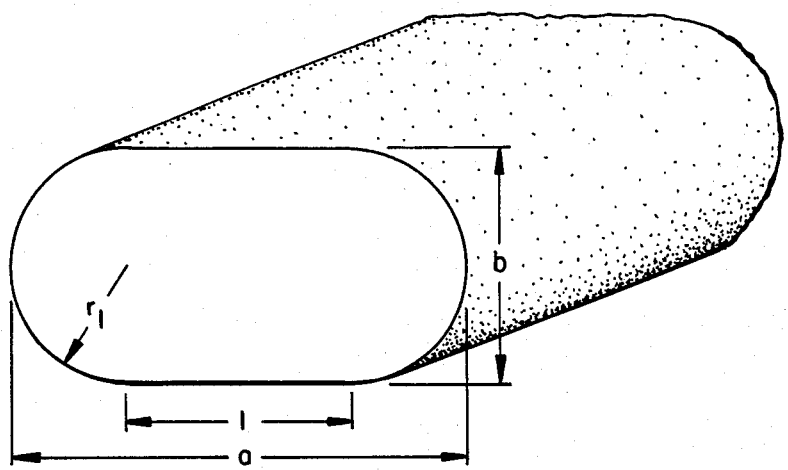
FIG. 1 shows a view of an oval shaped particle.

Due to shrinking world supply of crude oil, oil processers and refiners must use crudes that are highly contaminated with metals, particularly iron, nickel, and vanadium, and have high concentrations of nitrogen and sulfur. Valuable light products can be made with heavy metal containing feedstocks, for example, crude oil, topped crudes, atmospheric and vacuum residua, and various synthetic oils, for example, liquefied coal, and oil from oil shale, if the contaminating metals can be removed. Typical feedstocks that can be improved by use of the shaped catalyst of this invention include those with as high as 10 weight percent or more asphaltene content, where asphaltene is defined as that portion of the feedstock not soluble in n-heptane. Asphaltenes include as a major constituent large molecules that bind metals. The feedstocks of this invention will be characterized by containing at least 10 ppm nickel plus vanadium.

Catalyst Bases

Any catalyst base with a minimum mean pore diameter greater than about 40 Angstroms to about 120 Angstroms, as well as those with much larger pore diameters can be used for the catalyst particles of this invention.

Average pore diameter can be calculated by the following formula:

$$\text{Average Pore Diameter} = \frac{4 \times PV \times 10^4}{SA}.$$

where PV is equal to particle density-skeletal density, and SA is surface area, as determined by nitrogen absorption. The average pore diameter is expressed in Angstroms, pore volume in cc/g and surface area in m$^2$/g. Typical catalyst bases include those made of alumina or silica, or both, as well as other refractory inorganic oxides, for example, boria, magnesia, titania and the like. The catalyst support of the present invention can be manufactured by any conventional techniques. Catalyst bases can be all or part fibrous clays, for example sepiolite, attapulgite or halloysite.

The catalyst contains catalytic metals, in particular metals from Group VIB of the periodic table, especially molybdenum and tungsten and from Group VIII of the periodic table, especially nickel and cobalt. Catalytic metals may be placed in the support by conventional techniques, such as, comulling, impregnation, cogelling and the like. Levels of Group VIB metals useful for this invention are between 2 and 25 weight percent, when weight percent is measured as weight of reduced metal as a percentage of total particle weight, and between 0 and 15 weight percent and of Group VIII metals when weight percent is measured as weight of reduced metal as a percentage of total particle weight. Preferred Group VIB metals include molybdenum and tungsten, and preferred Group VIII metals include nickel, cobalt, platinum and palladium.

Shaped Catalyst Particles

One method to increase surface-to-volume ratio is to shape an extruded particle in shapes with other than solid circular cross-section. Catalyst particles can have a variety of possible shapes. These shapes include circular cross-section with channels and holes in them, and star shapes and the like. It has been found that preferred shapes are dictated by two practical considerations.

The first consideration is the manufacturing ease for making the die plate for the extruder. One preferred set of shapes includes those shapes that comprise overlapping circular elements, defined herein as fluted shapes. Die plates for these shapes are easily made by drilling overlapping circular holes. More complicated shapes can be obtained by punching the shapes out of the die plate. This is the preferred method for making elliptical and oval shapes, both with and without bumps.

The second consideration is that the shape chosen and the surface-to-volume ratio of the particles extruded change within acceptable limits as the die plate wears during extrusion. Excessive wear, partially due to corrosion, has been found to be a problem with conventional die plates which are frequently made from carbon steel. Alternative materials exist that may provide solutions to this problem, for example stainless steel and tungsten carbide dies, but wear will always be a factor in choosing a shape for extrusion of porous catalytic material.

The shape chosen should increase effective diffusivity and metals loading over round cylindrical shapes. It is believed that oval shapes and elliptical shapes have even better diffusivity and metals loading than do shapes of higher surface area to volume ratios but comprising circular segments.

Figure 2:
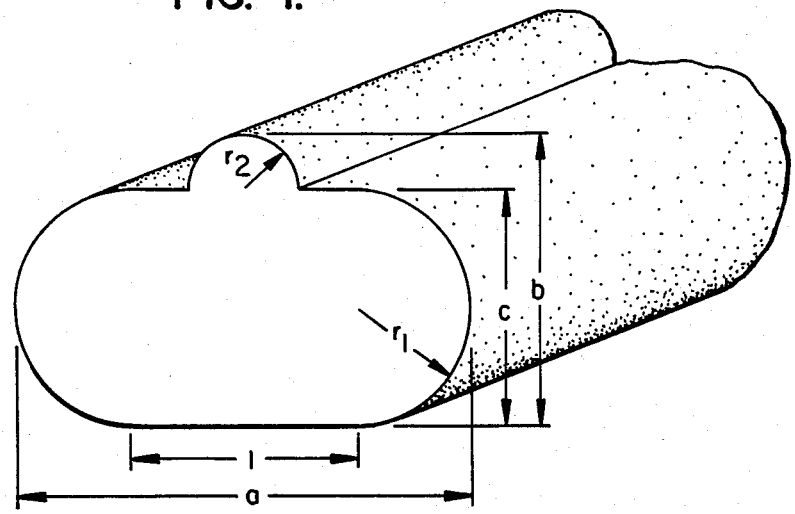
FIG. 2 shows a view of an oval shaped particle with one bump.
Figure 3:
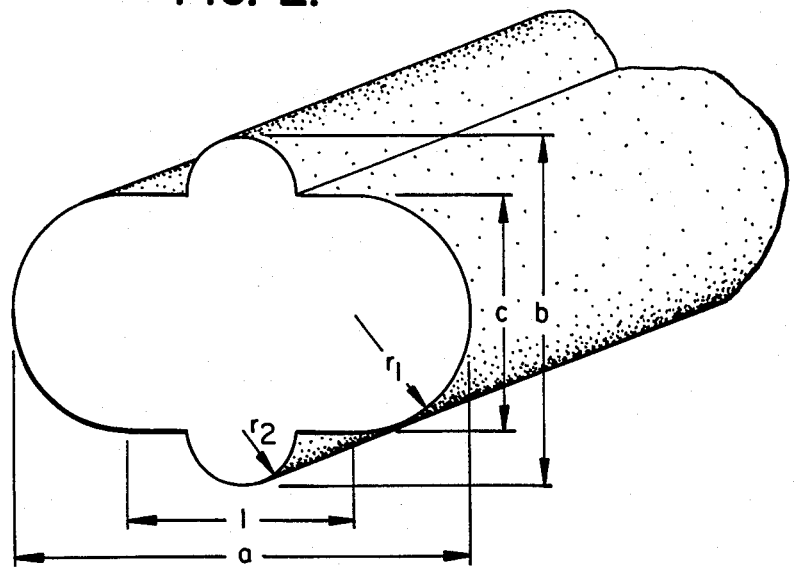
FIG. 3 shows a view of an oval shaped particle with two bumps.

The Figures show shapes that are suitable for this invention. FIG. 1 shows a particle with an oval cross-section. FIG. 2 shows a particle with an oval with a bump. FIG. 3 shows an oval with two bumps. "Oval" is defined as a shape that is two half circles separated by flat regions or less sharply curved regions, for example, elliptical shapes. "Bump" is defined herein as a section that extends from a flat surface of an oval or an area of relatively less curvature in an ellipse. Bumps provide a ridge along the extruded catalyst particles' length. The bumps limit how close any particle can approach any other particle and thereby limit pressure drop in a catalyst bed comprising catalyst particles with bumps in cross-section.

Each particle can be circumscribed by a rectangle having two dimensions, a first overall dimension and, perpendicular to the first dimension, a second overall dimension. The catalyst particles of this invention will have a first dimension in the range of between about 0.0600 inch and about 0.125 inch and a second dimension in the range of between about 0.030 inch to about 0.100 inch.

It is preferred that the first dimension be between 0.085 and 0.125 inch and the second dimension be between 0.065 and 0.100 inch.

Table 1 gives the dimensions of various shapes such that the surface area-to-volume ratio is less than about 95 reciprocal inches, preferably less than about 90 reciprocal inches.

TABLE 1

| | a | b | c | $r_1$ | $r_2$ |
|---|---|---|---|---|---|
| Oval | | | | | |
| $l = r_1$ | 1/16" | 1/24" | — | 1/48" | — |
| $l = 2r_1$ | 1/14" | 1/28" | — | 1/56" | — |
| $l = 3r_1$ | 1/12" | 1/30" | — | 1/60" | — |
| Surface-to-Volume Ratio: 85.3–92.62 inch$^{-1}$. | | | | | |
| Oval with One Bump | | | | | |
| $l = 2r_1$; $r_2 = r_1/2$ | 1/14" | 5/112" | 1/28" | 1/56" | 1/112" |
| $l = 2r_1$; $r_2 = r_1$ | 1/13" | 3/52" | 1/26" | 1/52" | 1/52" |
| $l = 3r_1$; $r_2 = r_1$ | 1/13" | 3/65" | 1/32" | 1/65" | 1/65" |
| Surface-to-Volume Ratio: 85.3–91.2 inch$^{-1}$. | | | | | |
| Oval with Two Bumps | | | | | |
| $l = 2r_1$; $r_2 = r_1/2$ | 1/14" | 3/56" | 1/28" | 1/56" | 1/112" |
| $l = 3r_1$; $r_2 = r_1/2$ | 1/12" | 1/20" | 1/30" | 1/60" | 1/120" |
| $l = 4r_1$; $r_2 = r_1$ | 1/12" | 1/18" | 1/36" | 1/72" | 1/144" |
| Surface-to-Volume Ratio: 85.8–93.14 inch$^{-1}$. | | | | | |

In Table 1, $r_1$ is a first radius, defined as being the radius at the end of the oval; $r_2$ is the radius of the bump; a is the overall width of the particle; b is the thickness without bumps and is equal to twice $r_1$; and c is the overall thickness through the bumps. The centerpoint of the bump defined by $r_2$ is centered at $\frac{1}{2}a$ for the examples shown, although the bump, could be displaced from the center. The oval examples shown all have both curved regions and flat regions. The flat regions are believed to give superior diffusional characteristics to the catalyst particle since each portion of area of the flat surface has a volume that corresponds to it within the catalyst particle that is at a right angle to the surface of the flat area, rather than a wedge shaped volume for each area on a circularly shaped particle. With shaped catalysts for each segment of interior volume, there is less surface area allowing diffusion to that volume.

The surface area to volume ratios shows a range because it includes the end area of the catalyst particles plus the area shaped by contact with the die for the catalyst particles. In Table 1 the range of length is between 2 times a to 4 times a.

Other non-circular shapes that will give a surface area to volume ratio of less than 95 reciprocal inches, preferably less than about 90 reciprocal inches, are within the skill of the art. For example, ovals with more than 2 bumps, shapes having more than one bump on the same side of the oval, and ellipses are within the skill of the art, as well as other shapes.

In the catalyst particles of this invention substantially all of the volume of the particles will be within 0.050 inch, preferably within 0.016 inch of the nearest extruded surface of the catalyst. "Substantially all" is defined herein to mean at least 85%. Extruded surface is defined to mean the surface of the particle formed by the extrusion die, that is, the shaped side surface and not the end surface.

Metals Penetration

Heterogeneous catalysts, such as metals on inorganic supports, are the preferred catalysts for many commercial processes. Hydrodemetalation is an example of a process that is catalyzed by heterogeneous catalysts and is believed to be diffusion limited. The catalyst shapes of this invention can be utilized for increasing the effective amount of catalyst volume a feedstock contacts in any diffusion limited reaction, while preventing undue pressure drop across the catalyst bed.

In one preferred embodiment catalyst particles of this invention are characterized by substantial metals penetration during hydroprocessing service to at least 0.015 inch of the nearest particle surface. Substantial metals penetration is herein defined as penetration of nickel or vanadium to that distance where the local concentration of metal, expressed as a percentage of maximum concentration of the metal within the particle, is at least 2% for nickel and vanadium.

Catalyst Preparation

A catalyst having a pore size distribution and catalytic metals loadings required by the present invention, can be prepared as follows. This catalyst consists of nickel oxide, tungsten oxide, silica, alumina, and titanium phosphate; and contains, prior to sulfiding, nickel, tungsten, silicon, aluminum, titanium, and phosphorus in the following percentages, expressed as oxides:

| Component | Weight Percent of Unsulfided Catalyst |
|---|---|
| NiO | 10.2 |
| $WO_3$ | 25.2 |
| $SiO_2$ | 20.0 |
| $Al_2O_3$ | 30.0 |
| $TiO_2$ | 8.0 |
| $P_2O_5$ | 6.6 |
| Total | 100.0 |

The following solutions were made:

SOLUTION 1

1385 Grams of stock solution of $AlCl_3$ and $H_2O$ containing
4.6 weight percent Al;
200 cc. acetic acid;
76 grams $TiCl_4$;
4500 cc. $H_2O$;
43 grams 85% $H_3PO_4$.

SOLUTION 2

282 Grams $NiCl_2$ and $H_2O$, containing 11.35 weight percent N.

SOLUTION 3

192 cc. Sodium silicate, containing 80 grams $SiO_2$ and 2000 cc. $H_2O$.

SOLUTION 4

3.75M $NH_4OH$, in the quantity indicated below.

SOLUTION 5

4067 cc. Sodium ammonium tungstate solution containing 0.075 grams tungsten per cc.

SOLUTION 6

3.75M $NH_4OH$, in the quantity indicated below.

Solution 2 was stirred into solution 1, and solution 3 was then added to the combined solution. Enough solution 4 was added to the combined solutions 1, 2 and 3 to bring the pH of the combined solutions 1, 2 3 and 4 to 4.0. Solution 5 was then added to the mixture of solutions 1, 2, 3 and 4. Enough of solution 6 was added to solutions 1-5 to bring the pH of solutions 1-6 to 7.2. The resulting slurry was filtered, and the resulting filter cake was washed with five separate washes of 13,000 cc. of 1% ammonium acetate solution. The washed filter cake was hot aged for 12 hours in an autoclave at 15 psig steam pressure, extruded through a die plate having perforations in the shape of ovals with two bumps. The first dimension of this die plate was 0.10 and the second was 0.085. The resulting shaped extrudate was dried in air for 15 hours and calcined in air at 950° F. for four hours to produce the final oxide form. This catalyst was then sulfided and used in hydrodenitrification service.

What is claimed is:

1. A catalyst for hydroprocessing heavy hydrocarbonaceous feedstocks, which catalyst:
   (a) comprises between 2 and 25 weight percent of a catalytic metal from Group VIB and between 0 and 15 weight percent of a catalytic metal from Group VIII supported on a catalyst base selected from the group consisting of refractory inorganic oxides, fibrous clays, and combinations thereof, where said weight percentages are based on the reduced catalytic metal content as a percentage of the total catalyst weight; and
   (b) has the form of elongated extrudates which have:
      (i) a cross-section which is an oval with at least one section extending from the flat surface of the oval and which has a first dimension between about 0.060 and about 0.125 inch and a second dimension, perpendicular to the first dimension, between about 0.030 and about 0.100 inch; and
      (ii) a surface area to volume ratio of less than 95 reciprocal inches.

2. The catalyst of claim 1 which has a surface area to volume ratio of less than 90 reciprocal inches.

3. The catalyst of claim 1 wherein the average pore diameter is between about 40 and about 120 Angstroms.

4. The catalyst of claim 1 wherein substantially all points in the interior of the extrudates are within about 0.050 inch of the nearest extruded surface of the extrudates.

5. The catalyst of claim 4 wherein substantially all points in the interior of the extrudates are within about 0.016 inch of the nearest extruded surface of the extrudates.

6. The catalyst of claim 1 wherein substantial metals penetration occurs to a depth of at least 0.015 inch of the nearest surface.

7. The catalyst of claim 1 wherein the first dimension is between 0.085 and 0.125 inch and the second dimension is between 0.065 and 0.100 inch.

8. The catalyst of claim 7 which has a surface area to volume ratio of less than 90 reciprocal inches.

9. The catalyst of claim 7 wherein the average pore diameter is between about 40 and about 120 Angstroms.

10. The catalyst of claim 7 wherein substantially all points in the interior of the extrudates are within about 0.050 inch of the nearest extruded surface of the extrudates.

11. The catalyst of claim 10 wherein substantially all points in the interior of the extrudates are within about 0.016 inch of the nearest extruded surface of the extrudates.

12. The catalyst of claim 7 wherein substantial metals penetration occurs to a depth of at least 0.015 inch of the nearest surface.

* * * * *